United States Patent [19]

Chen et al.

[11] Patent Number: 5,394,687

[45] Date of Patent: Mar. 7, 1995

[54] GAS TURBINE VANE COOLING SYSTEM

[75] Inventors: Allen G. Chen, Turkey Lake; Gerard G. McQuiggan, Orlando, both of Fla.

[73] Assignee: The United States of America as represented by the Department of Energy, Washington, D.C.

[21] Appl. No.: 161,032

[22] Filed: Dec. 3, 1993

[51] Int. Cl.⁶ .................... F02C 6/18; F02G 3/00
[52] U.S. Cl. .................... 60/39.07; 60/39.75
[58] Field of Search ............. 60/39.07, 39.29, 39.75; 415/58.4, 58.5, 115, 116, 117

[56] References Cited

U.S. PATENT DOCUMENTS

| | | | |
|---|---|---|---|
| 2,578,481 | 12/1951 | Lombard | 60/39.75 |
| 2,584,899 | 2/1952 | McLeod | 415/115 |
| 2,652,216 | 9/1953 | Hoffman | 244/74 |
| 2,791,090 | 5/1957 | Hooker | 60/39.08 |
| 3,641,766 | 2/1972 | Uehling | 60/39.75 |
| 3,652,181 | 3/1972 | Wilhelm, Jr. | 415/117 |
| 3,751,909 | 8/1973 | Kohler | 415/117 |
| 3,759,038 | 9/1973 | Scalzo et al. | 415/117 |
| 4,153,386 | 5/1979 | Leogrande et al. | 415/117 |
| 4,254,618 | 3/1981 | Elovic | 60/226 R |
| 4,291,531 | 9/1981 | Campbell | 60/39.75 |
| 4,302,148 | 11/1981 | Tubbs | 415/117 |
| 4,358,926 | 11/1982 | Smith | 60/39.83 |
| 4,474,001 | 10/1984 | Griffin et al. | 60/204 |
| 4,487,016 | 12/1984 | Schwarz et al. | 60/39.75 |
| 4,739,621 | 4/1988 | Pettengill et al. | 60/757 |
| 4,761,947 | 8/1988 | Hennecke et al. | 60/39.75 |
| 4,962,640 | 10/1990 | Tobery | 415/115 |
| 5,003,773 | 4/1991 | Beckwith | 60/262 |
| 5,142,859 | 9/1992 | Glezer et al. | 60/39.75 |

FOREIGN PATENT DOCUMENTS

| | | | |
|---|---|---|---|
| 865773 | 2/1953 | Germany | 415/58.5 |
| 293778 | 10/1953 | Switzerland | 415/116 |

Primary Examiner—Richard A. Bertsch
Assistant Examiner—Howard R. Richman
Attorney, Agent, or Firm—G. R. Jarosik

[57] ABSTRACT

A cooling system for stationary vanes in the turbine section of a gas turbine. Combustors for the turbine are disposed in a chamber that receives compressed air from a compressor section. This compressed air forms both combustion air and cooling air. The cooling air portion of the compressed air is recirculated through the vanes by bleeding it from the chamber and further pressurizing it, after which it flows through a cooling air flow path in the vanes, thereby resulting in the cooling of the vanes and the heating of the air. The heated air is then returned to the chamber where it mixes with the incoming combustion air, thereby giving up a portion of the heat transferred from the vane to the combustion air. As a result, the temperature of the combustion air is increased, thereby increasing the thermodynamic efficiency of the gas turbine. The cooling scheme provides cooling to the vane inner and outer shrouds, as well as the airfoil, by means of circumferentially extending holes in the shrouds that connect with a cooling air cavity in the airfoil.

15 Claims, 4 Drawing Sheets

GAS TURBINE VANE COOLING SYSTEM

BACKGROUND OF THE INVENTION

The present invention relates to a cooling system for a stationary vane in a gas turbine. More specifically, the present invention relates to a cooling air system in which compressed air is recirculated through the vane.

A gas turbine is comprised of a compressor section that produces compressed air that is subsequently heated by burning fuel in a combustion section. The hot gas from the combustion section is directed to a turbine section where the hot gas is used to drive a rotor shaft to produce power. The combustion section is typically comprised of a shell that forms a chamber that receives compressed air from the compressor section. A plurality of cylindrical combustors are disposed in the chamber and receive the compressed air along with the fuel to be burned. A duct is connected to the aft end of each combustor and serves to direct the hot gas from the combustor to the turbine section.

The turbine section typically employs a plurality of stationary vanes circumferentially arranged in rows. Since such vanes are exposed to the hot gas discharging from the combustion section, cooling of these vanes is of utmost importance. Traditionally, cooling was accomplished by flowing cooling air from the chamber through a cavity formed in the airfoil portion of the vane, which is essentially hollow. Typically, a number of small passages are formed inside the vane airfoil that extend from the cavity to the surfaces of the vane, such as the leading and trailing edges or the suction and pressure surfaces. Often, such as in the case of leading edge cooling, the passages direct the cooling air from the cavity so that it flows over the surface of the vane in a thin film, thereby cooling the vane in what is often referred to as "film cooling." In any case, after the cooling air exits the vane passages, it enters and mixes with the hot gas flowing through the turbine section.

Unfortunately, the traditional approach to cooling the turbine vanes has a detrimental impact on the thermal efficiency of the gas turbine. Although the cooling air eventually mixes with the hot gas expanding in the turbine, since it bypasses the combustion process the work recovered from the expansion of the compressed cooling air is much less than that recovered from the expansion of the compressed air heated in the combustors. In fact, as a result of losses due to pressure drop and mechanical efficiency, the work recovered from the cooling air is less than that required to compress the air in the compressor. In addition, discharging the cooling air into the hot gas flow results in aerodynamic losses as the cooling air mixes with the hot gas.

Moreover, although the traditional scheme may provide adequate cooling of the airfoil portion of the vane, albeit at the expense of efficiency, it does not provide thorough cooling of the inner and outer shroud portions of the vane, so that deterioration of these components can limit the operating temperature of the turbine.

It is therefore desirable to provide a cooling system for a gas turbine vane that does not result in discharging cooling air directly into the hot gas flow path by bypassing the combustors, and that achieves effective cooling of the inner and outer shrouds.

SUMMARY OF THE INVENTION

Accordingly, it is the general object of the current invention to provide a gas turbine vane that does not result in discharging cooling air directly into the hot gas flow path by bypassing the combustors, and that achieves effective cooling of the inner and outer shrouds.

Briefly, this object, as well as other objects of the current invention, is accomplished in a gas turbine, comprising (i) a compressor section for producing compressed air, a first portion of the compressed air forming cooling air and second portion of the compressed air forming combustion air, (ii) a shell forming a chamber in flow communication with the compressor, whereby the cooling air and combustion air portions of the compressed air flow into the chamber, (iii) a row of stationary vanes, each of the vanes having a flow path formed therein, the flow paths being in flow communication with the cooling air in the chamber, and (iv) means for recirculating the cooling air from the chamber to the vane paths and then back to the chamber, thereby transferring heat from the vanes to the cooling air so as to cool the vanes and heat the cooling air.

In one embodiment of the invention, the gas turbine further comprises a combustor for burning a fuel therein. The combustor is in flow communication with the combustion air portion of the compressed air from the chamber so the combustor heats the combustion air. In addition, the chamber has means for placing the combustor in flow communication with a first portion of the cooling air that has been recirculated back to the chamber from the vane flow paths, so that the cooling air flows through the combustor after being heated by the heat transfer from the vanes. In this embodiment, the chamber has means for again recirculating a second portion of the cooling air back to the vane flow paths.

In a preferred embodiment of the invention, each of the vanes comprises inner and outer shrouds and an airfoil portion formed therebetween. Each of the vane flow paths comprise a first passage extending through the inner and outer shrouds as well as the airfoil, and a second passage that is in flow communication with the first passage and that extends through one of the shrouds in the circumferential direction.

DESCRIPTION OF THE PREFERRED EMBODIMENT

Figure 1:
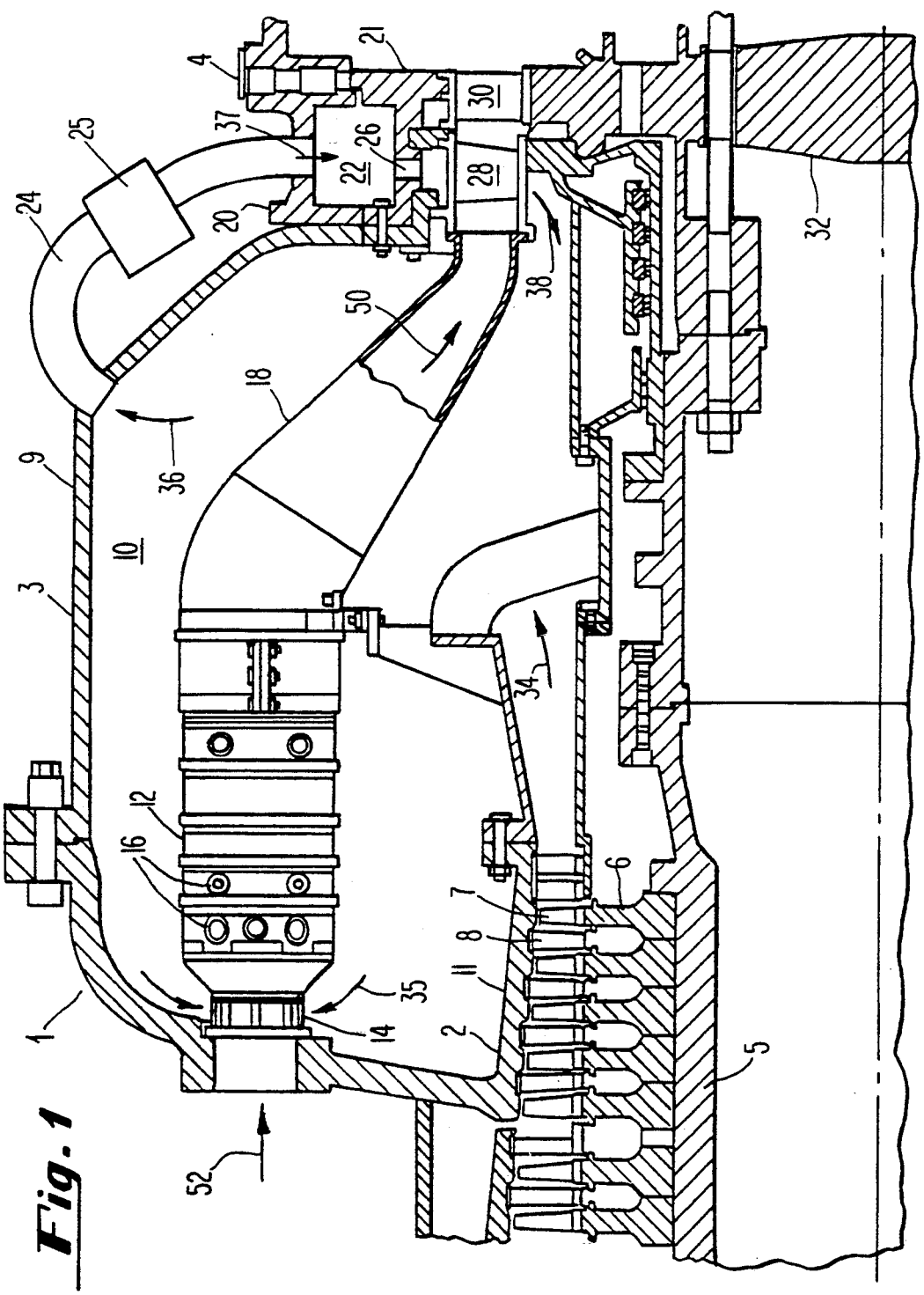
FIG. 1 is a longitudinal cross-section through a portion of a gas turbine in the vicinity of the combustion section, showing the vane cooling system according to the current invention.

Referring to the drawings, there is shown in FIG. 1 a longitudinal cross-section of a portion of a gas turbine 1. The gas turbine is comprised of three main components: a compressor section 2, a combustion section 3, and a turbine section 4. A rotor 5 is centrally disposed in the gas turbine and extends through the three sections. The compressor section 2 is comprised of a cylinder 11 that encloses alternating rows of stationary vanes 8 and rotating blades 7. The stationary vanes 8 are affixed to the cylinder 11 and the rotating blades 7 are affixed to discs 6 attached to the rotor 5.

The combustion section 3 is comprised of a shell 9 that forms a chamber 10 in Which are disposed a plurality of combustors 12 and ducts 18 that connect the combustors to the turbine section 4. A fuel 52 is supplied to each combustor 12 by a nozzle (not shown).

The turbine section 4 is comprised of an outer cylinder 20 that encloses an inner cylinder 21 so as to form an annular manifold 22 therebetween. The inner cylinder 21 encloses a row of stationary vanes 28 and a row of rotating blades 30. The stationary vanes 28 are affixed to the inner cylinder 21 and the rotating blades 30 are affixed to a disc 32 that forms a portion of the turbine section of the rotor 5.

In operation, the compressor inducts ambient air into its inlet and discharges compressed air 34 into the chamber 10 formed by the shell 9. The major portion 35 of the air 34 in the chamber 10 forms the combustion air necessary for burning the fuel 52. The remainder of the compressed air 34 forms cooling air used to cool various components of the gas turbine. The portion 36 of this cooling air that is used to cool the vanes 28 is discussed in detail below. However, as those skilled in the art will readily appreciate, other portions of the cooling air are used to cool the rotor, as well as other portions of the turbine section, as is conventional. Accordingly, the workings of these conventional cooling schemes will not be discussed herein.

The combustion air 35 enters the combustors 12 through openings 14 in its inlet end, as well as through holes 16 downstream of the combustor inlet. In the combustors 12, the fuel 52 is injected into and mixed with the combustion air 35 and burned, thereby forming a hot, compressed gas 50. The hot, compressed gas 50 flows through the ducts 18 and then through the rows of stationary vanes 28 and rotating blades 30 (as well as additional, downstream rows of stationary vanes and blades not shown) in the turbine section 4, wherein the gas expands and generates power that drives a load (not shown) connected to the rotor 5. The expanded gas then exits the turbine, whereupon it may be exhausted to atmosphere or directed to a heat recovery steam generator.

The stationary vanes 28 in the turbine section 4 are exposed to the hot gas 50 from the combustors 12, which may be in excess of 1090° C. (2000° F.), and are subjected to a variety of stresses, including those due to forces imposed by the flow of hot gas 50, as well as those due to differential thermal expansion. Since the ability of the material that forms the vanes to withstand stress decreases with increasing temperature, it is vital to provide adequate cooling to maintain the temperature of the vane material within allowable levels.

In the preferred embodiment, this cooling is accomplished by recirculating the portion 36 of the compressed air 34 from the chamber 10 through the vanes 28 and back to the chamber. This recirculation is accomplished by bleeding air 36 through an external pipe 24 connected to the shell 9. A fan 25 is disposed in the pipe 24 and further pressurizes the compressed air 36, causing it to flow into the manifold 22. From the manifold 22, the pressurized air 37 flows through holes 26 in the inner cylinder 21 and then through a cooling air flow path in the vanes 28, discussed further below. In so doing, heat is transferred from the vane 28 to the compressed air 37, thereby cooling the vane and heating the compressed air. The vane cooling air flow path is isolated from the hot gas 50 flowing through the turbine section so that all of the compressed air 37, which is now heated compressed air 38, exits the vane 28 and is returned to the chamber 10.

In the chamber 10, the recirculated air 38 mixes with the incoming compressed air 34, so that a first portion of the recirculated air 38 enters the combustion air 35 supplied to the combustor 12 and a second portion of the recirculated air, together with a fresh portion of the incoming compressed air 34 with which it is mixed, is again recirculated through the vanes 28. Thus, the arrangement of the combustors 12, the pipe 24 inlet, the vane 28 cooling flow path exits and the chamber 10 formed by the shell 9 serves to divide the incoming compressed air 34 into a first portion 35 that is heated in the combustors 12 and a second portion 36 that is heated in the vanes 28 and, further serves to divide the heated recirculated cooling air 38 returned from the vanes 28 into a first portion that mixes with the combustion air 35 entering the combustors, thereby heating same, and a second portion that is mixed with the incoming compressed air 34, thereby being cooled, and then again re-circulated through the vanes 28.

As a result of this constant mixing, the recirculating air 36 remains relatively cool without the use of external coolers that would result in the loss of heat from the cycle. In addition, the heat transferred to the recirculating air 36 is reflected in an increase in the temperature of the combustion air 35. This increase in temperature of the combustion air 35 decreases the quantity of fuel 52 required to achieve the desired turbine inlet temperature, thereby improving thermodynamic efficiency.

Contrary to traditional cooling schemes, none of the vane cooling air 37 is discharged directly—that is, without first being heated in the combustors 12—into the hot gas flow 50. Therefore, according to the current invention, vane cooling is accomplished without the thermodynamic and mixing losses associated with traditional schemes as previously discussed.

Figure 2:
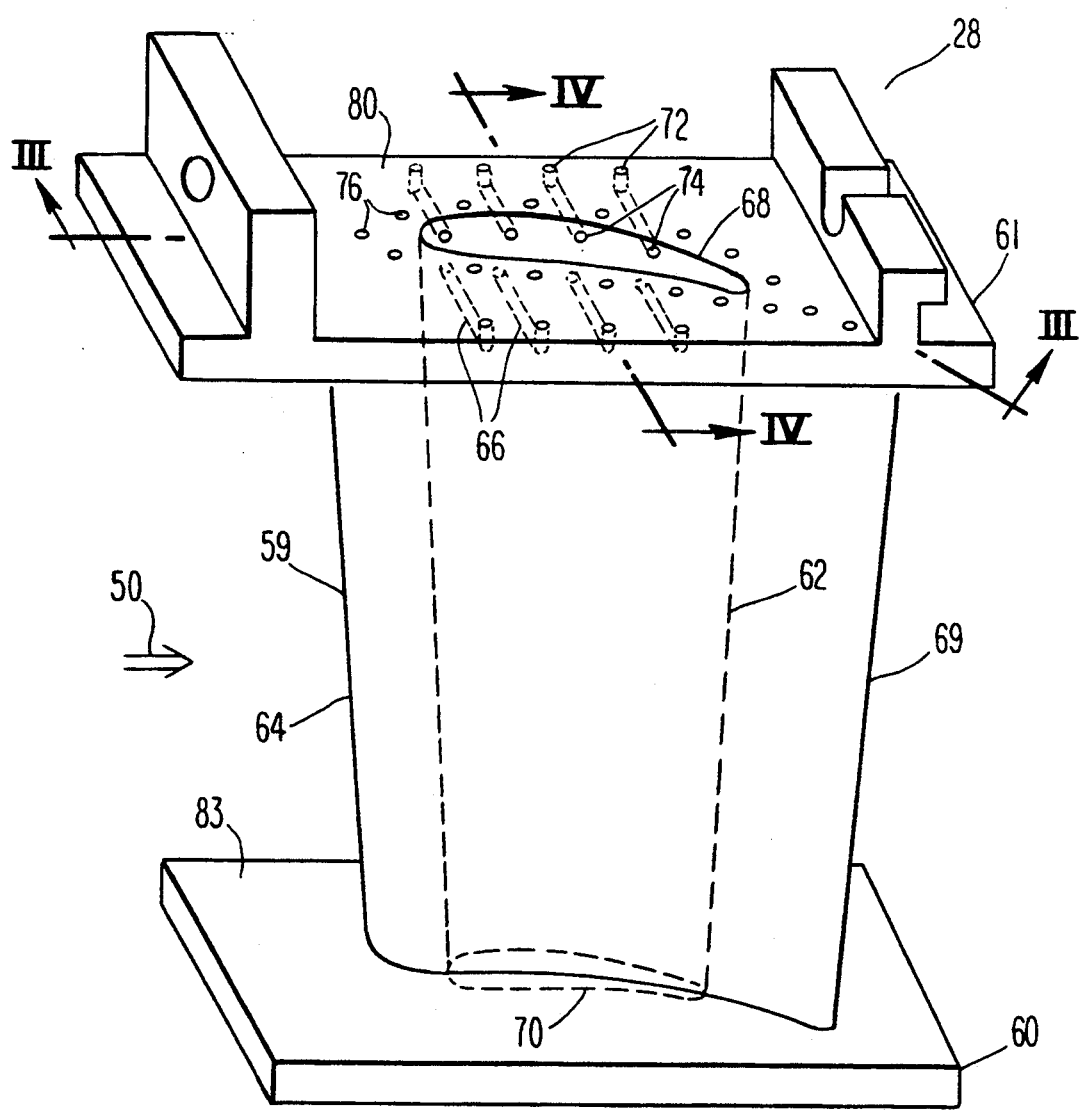
FIG. 2 is an isometric view of one of the turbine vanes shown in FIG. 1.
Figure 3:
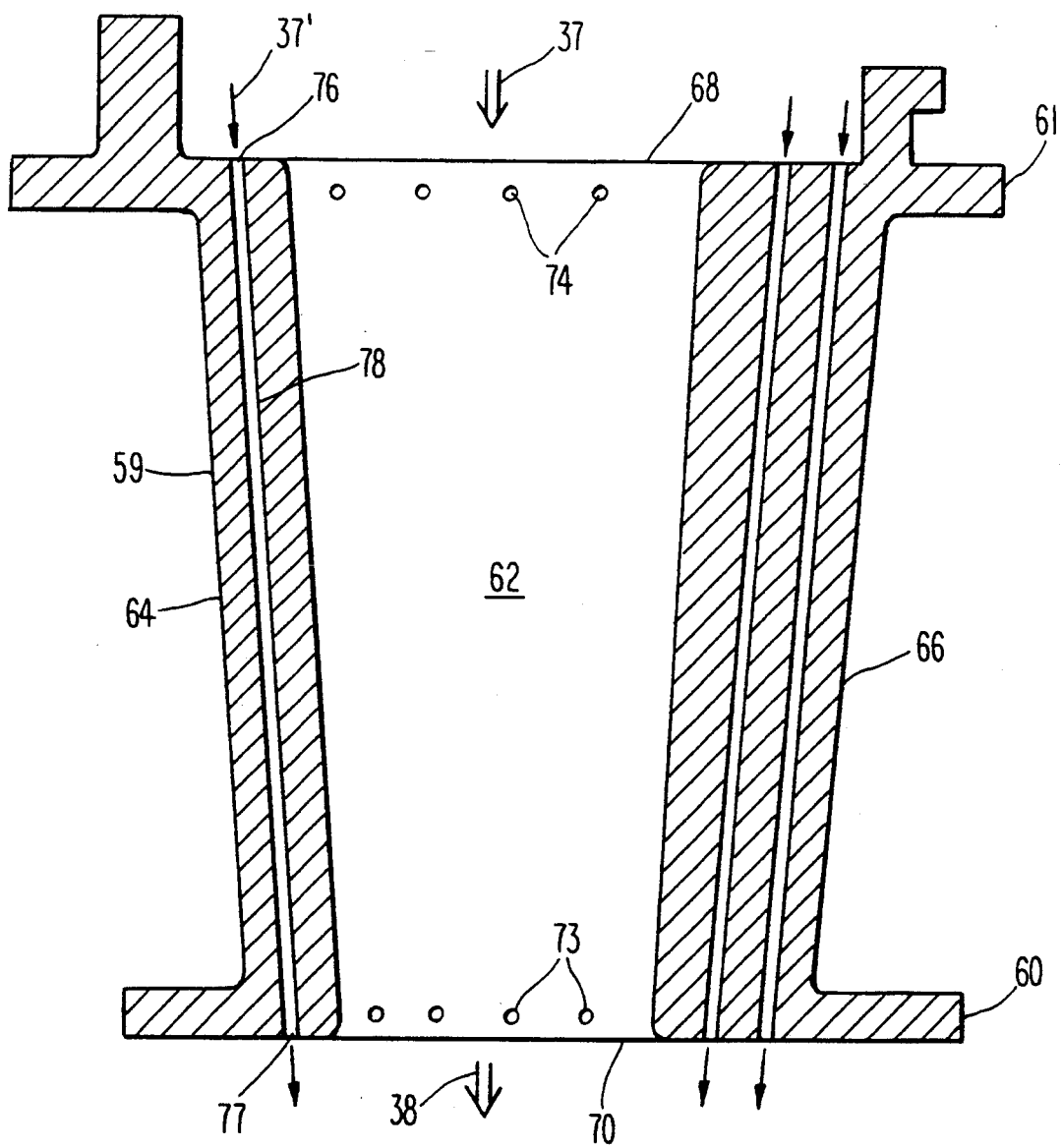
FIG. 3 is an approximately longitudinal cross-section of the vane shown in FIG. 2 taken through line III—III.
Figure 4:
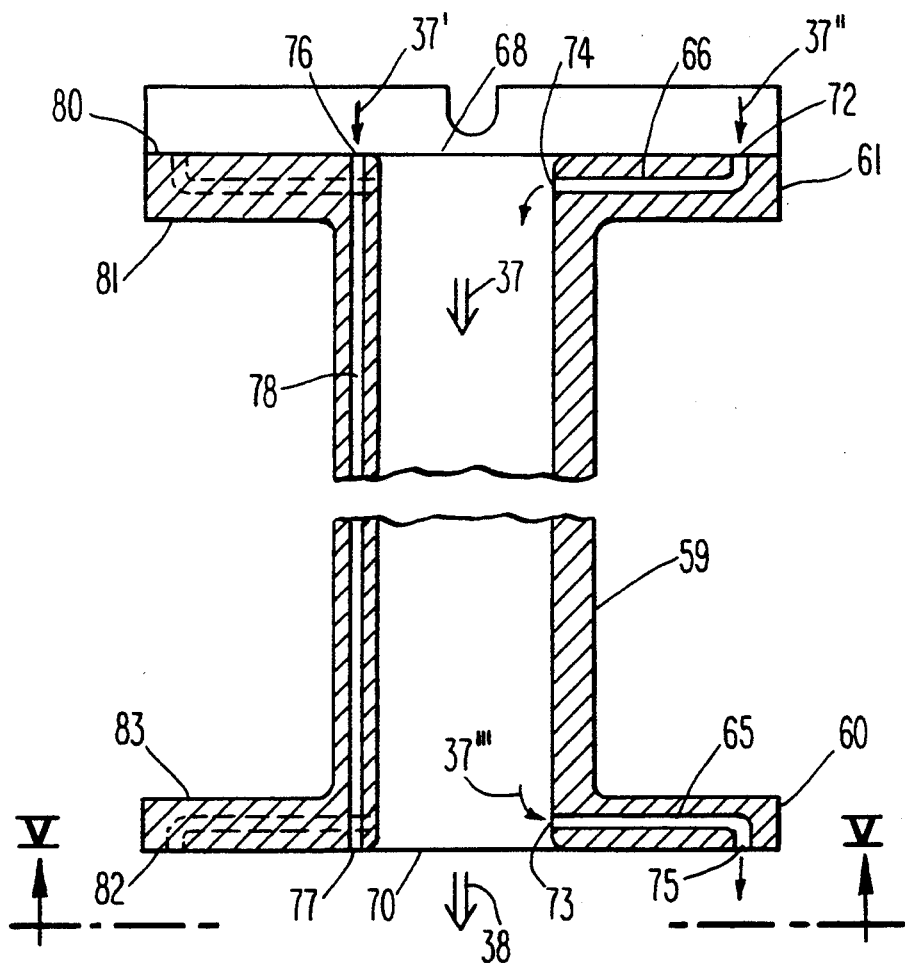
FIG. 4 is a transverse cross-section of the vane shown in FIG. 2 taken through line IV—IV.

The cooling air flow path through the vanes 28 will now be discussed in detail. As shown in FIGS. 2–4, the vane 28 is comprised of an inner shroud portion 60, an outer shroud portion 61, and an airfoil portion 59 that is disposed between the inner and outer shrouds. As shown in FIG. 2, the airfoil 59 has a leading edge portion 64 and a trailing edge portion 69. The outer shroud 61 has a surface 81 that faces toward the airfoil 59 and a surface 80 that faces away from the airfoil. Similarly, the inner shroud 60 has a surface 83 that faces toward the airfoil 59 and a surface 82 that faces away from the airfoil.

The airfoil 59 is essentially hollow and has a cavity 62 extending radially through it that serves as the primary cooling air passage for the vane 28. The cavity 62 has an inlet 68 formed in the outer shroud 61 that receives the pressurized cooling air 37 from the manifold 22, as previously discussed. After flowing radially inward through the cavity 62 and receiving heat from the vane 28, the heated cooling air 38 exits the vane via an outlet 70 formed in the inner shroud 60, whereupon it returns to the chamber 10, as previously discussed.

The vane cooling air flow path also includes a number of small secondary airfoil cooling air passages 78 that are distributed around the cavity 62 as well as within the portions of the airfoil 59 adjacent the leading edge 64 and trailing edge 69. As shown best in FIGS. 3 and 4, the secondary airfoil passages 78 have inlets 76 formed in the surface 80 of the outer shroud 61 and outlets 77 formed in the surface 82 of the inner shroud 60. The passages 78 extend through the airfoil 59 between their inlets 76 and outlets 77 in substantially the radial direction. A portion 37' of the pressurized cooling air 37 from the manifold 22 enters the inlets 76, flows through the passages 78, and exits the vane 28 through the outlets 77, whereupon it returns to the chamber 10. In this manner, the secondary airfoil passages 78 provide additional cooling for the airfoil 59.

According to an important aspect of the current invention, additional cooling air passages 65 and 66 are formed in the inner and outer shrouds 60 and 61, respectively. As shown in FIGS. 2 and 4, the outer shroud passages 66 have inlets 72 formed in the outer shroud surface 80 and outlets 74 formed in the wall of the cavity 62. After extending radially inward through the outer shroud 61 to approximately mid-way between the surfaces 80 and 81, the passages 66 make a right angle turn and then proceed to the cavity 62 in substantially the circumferential direction—that is, substantially tangentially to the center line of the rotor 5 and the direction of hot gas 50 flow through the turbine section 4.

The outer shroud passage inlets 72 receive a portion 37'' of the pressurized cooling air 37 from the manifold 22 and the outlets 74 discharge this cooling air into the cavity 62, whereupon it returns to the chamber 10. In this manner, the outer shroud passages 66 provide cooling that is specifically directed to the outer shroud 61.

Figure 5:
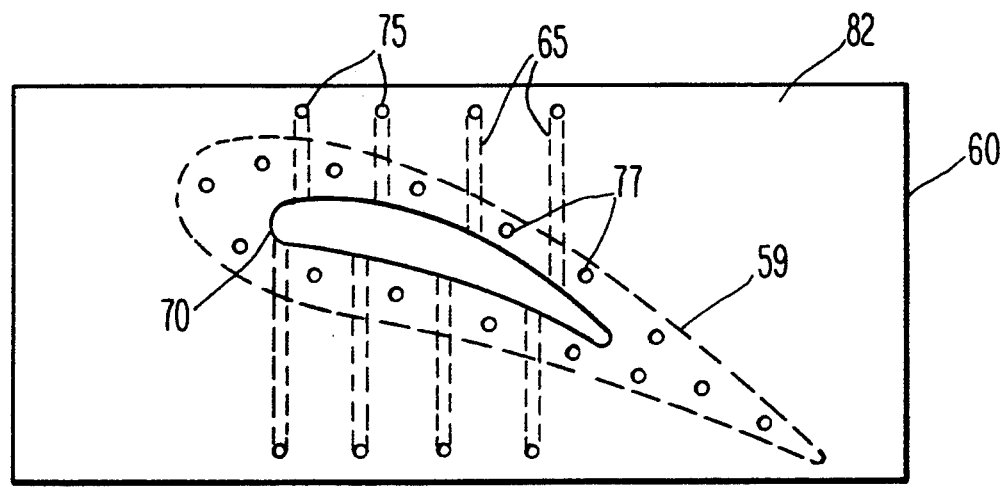
FIG. 5 is a view of the inner shroud taken along line V—V shown in FIG. 4.

As shown in FIGS. 2 and 5, the inner shroud passages 65 have inlets 73 formed in the wall of the cavity 62 and outlets 75 formed in the inner shroud surface 82. After extending from the cavity 62, at a location approximately mid-way between the surfaces 82 and 83, in substantially the circumferential direction, the passages 65 make a right angle turn and then proceed radially inward to the inner shroud surface 82.

The inner shroud passage inlets 73 receive a portion 37''' of the pressurized cooling air 37 from the manifold 22 after it has already flowed through most of the cavity 62. The outlets 75 discharge this cooling air for return to the chamber 10. In this manner, the inner shroud passages 65 provides cooling that is specifically directed to the inner shroud 61.

It should be noted that at no point is the cooling air path through the vanes 28 in flow communication with the hot gas 50 flowing through the turbine section 4. Thus, all of the cooling air 37 is returned to the chamber 10. As can be seen, the cooling system of the current invention provides a recirculating cooling scheme that provides effective cooling of the turbine vanes 28 without the detriments to the thermodynamic efficiency of the gas turbine 1 that is associated with traditional cooling schemes. In addition, the cooling system of the current invention provides effective cooling for the inner and outer shrouds, as well as the airfoil portion of the vanes.

Although the invention has been described with reference to cooling of a stationary vane in a gas turbine, the present invention is applicable to cooling other components as well and, therefore, may be embodied in other specific forms without departing from the spirit or essential attributes thereof. Accordingly, reference should be made to the appended claims, rather than to the foregoing specification, as indicating the scope of the invention.

We claim:

1. A gas turbine, comprising:
   a compressor for producing compressed air;
   a centrally disposed rotor;
   a combustion section enclosed by a shell, said shell forming a chamber therein in flow communication with said compressor, said combustion section including a plurality of combustors for producing a hot gas disposed in said chamber and in flow communication therewith;
   a turbine section in flow communication with said combustors and forming a flow path for said hot gas, said turbine section including a plurality of vanes, each of said vanes being substantially hollow so as to form a cooling air passage therein, said cooling air passages being in direct flow communication with said chamber;
   means for cooling said vanes, said vane cooling means including means for recirculating a portion of said compressed air from said chamber through said vanes and back to said chamber and mixing said recirculated portion with said compressed air.

2. The gas turbine according to claim 1, wherein:
   a) said turbine section comprises a manifold in flow communication with each of said vane cooling air passages; and
   b) said vane cooling means further comprising a conduit for placing said chamber in flow communication with said manifold.

3. The gas turbine according to claim 2, wherein said vane cooling means further comprises a fan disposed in said conduit.

4. A gas turbine, comprising:
   a compressor section for producing compressed air, a first portion of said compressed air forming cooling air and a second portion of said compressed air forming combustion air;
   a shell forming a chamber in flow communication with said compressor, whereby said cooling air and combustion air portions of said compressed air flow into said chamber;
   a row of stationary vanes, each of said vanes comprising an inner shroud, an outer shroud, and an airfoil portion, each of said vanes having a cooling air flow path comprising a first passage extending through said inner and outer shrouds and said airfoil portion and having an inlet and an outlet, said outlet being in direct flow communication with said chamber whereby cooling air exits said vane directly into said chamber for admixing with said compressed air; and
   means for recirculating said cooling air from said chamber to said vane cooling air flow paths and then directly back to said chamber, thereby transferring heat from said vanes to said cooling air so as to cool said vanes and heat said cooling air.

5. The gas turbine according to claim 4, further comprising a combustor for burning a fuel therein, said combustor in flow communication with said combustion air portion of said compressed air from said chamber, wherein said combustor heats said combustion air.

6. The gas turbine according to claim 5, wherein said chamber comprises means (i) for placing said combustor in flow communication with a first portion of said cooling air that has been recirculated back to said chamber from said vane cooling air flow paths, whereby said first portion of said cooling air flows through said combustor after being heated by said heat transfer from said vanes, and (ii) for again recirculating through to said vane cooling air flow paths a second portion of said cooling air that was recirculated back to said chamber from said vane cooling air flow paths.

7. The gas turbine according to claim 6, wherein said combustor is disposed in said chamber.

8. The gas turbine according to claim 4, wherein said recirculating means comprises means for further pressurizing said cooling air.

9. The gas turbine according to claim 8, wherein said further pressurizing means is a fan.

10. The gas turbine according to claim 4, wherein each of said vane cooling air flow paths further comprises a second passage extending through one of said shrouds.

11. The gas turbine according to claim 10, wherein said second passage is in flow communication with said first passage.

12. The gas turbine according to claim 10, wherein said second passage has a first opening disposed in said first passage.

13. The gas turbine according to claim 12, wherein said one of said shrouds through which said second passageway extends has a first surface facing toward said airfoil and a second surface facing away from said airfoil, and wherein said second passage has a second opening formed in said second surface.

14. The gas turbine according to claim 13, wherein said one of said shrouds through which said second passage extends is said outer shroud, and wherein said first opening of said second passage comprises an outlet for said second passage and said second opening comprises an inlet for said second passage.

15. The gas turbine according to claim 13, wherein said one of said shrouds through which said second passage extends is said inner shroud, and wherein said first opening of said second passage comprises an inlet for said second passage and said second opening comprises an outlet for said second passage.

* * * * *